June 3, 1924.

H. V. LINDERMAN

CONDUCTOR SUPPORT

Original Filed April 27, 1923

1,496,472

Inventor
HARRY V. LINDERMAN.

G. G. Allenbaugh

By

Attorney

Patented June 3, 1924.

1,496,472

UNITED STATES PATENT OFFICE.

HARRY V. LINDERMAN, OF MANSFIELD, OHIO, ASSIGNOR TO THE OHIO BRASS COMPANY, OF MANSFIELD, OHIO, A CORPORATION OF NEW JERSEY.

CONDUCTOR SUPPORT.

Application filed April 27, 1923, Serial No. 635,004. Renewed January 16, 1924.

*To all whom it may concern:*

Be it known that I, HARRY V. LINDERMAN, a citizen of the United States of America, residing at Mansfield, in the county of Richland and State of Ohio, have invented certain new and useful Improvements in Conductor Supports, of which the following is a specification.

My invention relates to a support for trolley wires and more particularly to an insulated support adapted for use with a trolley wire clamp or ear.

The object of my invention is to produce a support of the class herein described which is adjustable with respect to the trolley ear or clamp in order that the trolley ear or clamp may be attached with a tight joint to the support.

With supports of this type, which are usually manufactured in a single piece, it is very seldom that the upper face of the ear or clamp will fit securely to the lower face of the support and this permits moisture to work in against the threads of the support and in time cause excessive rusting which may eventually permit the clamp or ear to be released from the support.

Figure 1:
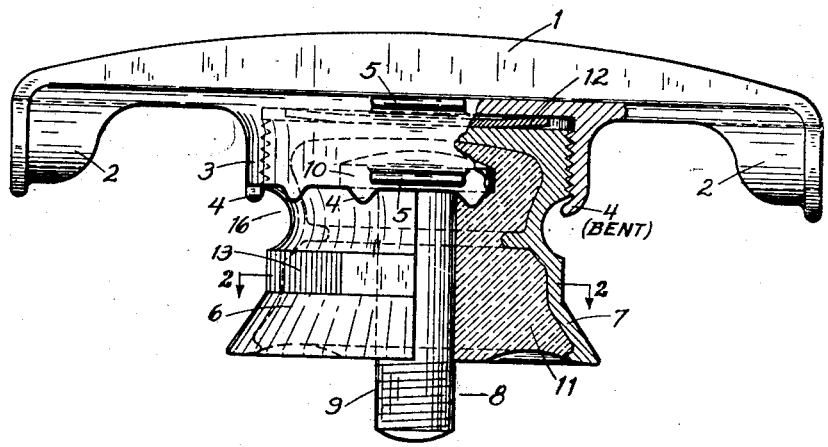
Fig. 1 shows a side view in elevation of my invention in partial section.

In the preferred embodiment of my invention I employ a yoke member 1 provided with U shaped end clips 2 to receive a span wire or other similar support. The yoke member 1 is also provided with an inverted cup-shaped portion 3 internally threaded and the cup shaped portion is provided on its lower edge with lugs 4 which are adapted to be turned inwardly after the parts have been assembled and thereby prevent the parts from separating. Projecting sideways from the cup-shaped portion are lugs 5—5 forming therebetween a groove to receive the span wire and maintain it in position with respect to the yoke member.

My device has also an inverted cup shaped insulator 6 comprising a shell 7 which has its side surface at the upper end threaded to engage with the threads within the cup-shaped member 3. Positioned within the member 7 is a supporting stud 8 provided with threads 9 at its lower end and an enlarged head 10 at its upper end. The supporting stud is spaced from the member 7 and insulated therefrom by means of the compressed or molded insulating material 11. Interposed between the upper face of the member 6 and the adjacent face of the yoke member 1 is a spring washer 12. This washer tends to prevent the parts from rotating relatively to each other after the device has been properly installed upon a suspension wire and clamp, or ear, and the latter alined with respect to the trolley wire.

In installing the device the yoke member 1 is usually placed in position upon the span wire and the ear or clamp is then secured to the stud 8 until the face of the ear or clamp is in secure engagement with the lower face of the member 6 and if the ear or clamp is then not in alinement with the trolley wire, the member 6 with the ear or clamp secured thereto is rotated until alinement is secured. To obtain the best results from the spring washer 12, it is well to have the parts 1 and 6 screwed together as far as possible and yet secure proper alinement of the parts. The member 6 is provided with faces 13 for the application of a wrench for rotating the member 6 and the clamp secured thereto relative to the member 1 and the clamp or ear.

Figure 3:
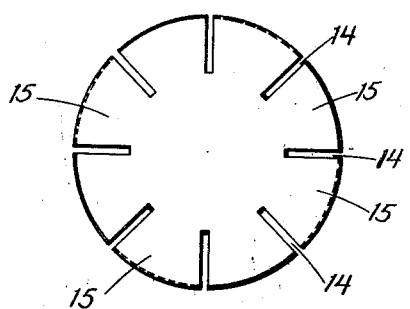
Fig. 3 is a top plan view of a spring washer which I employ.
Figure 4:
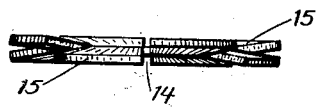
Fig. 4 is a side view of Fig. 3.
Figure 2:
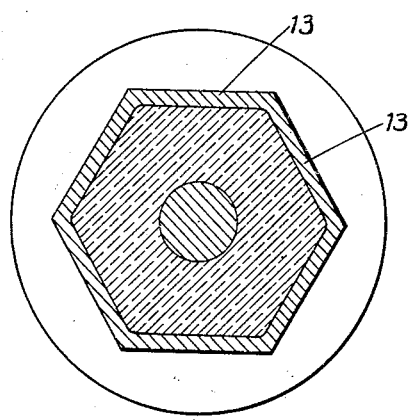
Fig. 2 is a sectional view on the line 2—2 of Fig. 1.

The spring washer 12 is shown in detail in Figs. 3 and 4 and comprises a fairly heavy disc of metal having a plurality of slots 14 forming the wings 15 and the alternate wings being bent up or down as shown, thereby giving the disc a spring effect dependent upon the amount of compression given the wings and the thickness thereof.

After or before installing the device upon the span wire and trolley, if so desired, one or more of the lugs 4 can be bent into the groove 16 by means of a hammer to positively hold the parts together, although this is not necessary but preferred by some.

It sometimes happens in supports of the class described that the composition insulator may puncture from one cause or another, and where the parts are of a unitary construction the whole device must be thrown away. With my construction, should such a condition occur it is only necessary to replace the member 6 which can be done much more easily and economically than replacing the whole device. Also, if other styles or types of yoke members are to be used with the same body member 6, or vice versa, my improved construction offers a simple and economical means of bringing about this result both to the advantage of the manufacturer and user.

There are various modifications which can be made from the construction herein described and shown in the drawings, but I do not wish to be limited otherwise than by my claims.

What I claim is:—

1. A conductor support comprising a member to engage a span wire and a two part member having its parts separated and insulated, means for securing the parts together in rotative relation and means yieldingly restricting the relative rotation of the parts.

2. A conductor support comprising a member provided with supporting means, a two part member having its parts separated and insulated from each other, means for securing the parts together in rotative relation and yielding means interposed between the said members to restrict their relative rotation.

3. A conductor support comprising two members rotatable relative to each other, one member to attach to a support and to support the second member and means on the second member to attach to a conductor clamp, means insulated from the first said means securing the members together in rotative relation and yielding means interposed between the parts to restrict the freedom of relative rotation of the members.

4. A conductor support comprising a member provided with means to engage a span wire or other support, a two part member having its parts separated and insulated from each other, means to secure the parts together in rotative relation and to move axially of each other when rotated, means to resist the free relative rotation of the members.

5. A conductor support comprising a supporting member provided with an inverted cup-shaped member, a body member provided with two parts separated and insulated from each other and adapted to be positioned within the cup-shaped member, one of the parts provided with a circumferential groove, means on the supporting member to be bent into the groove to hold the parts against separation and means interposed between the supporting and body members to resist relative rotation of the last said members.

6. A conductor support comprising a supporting member provided with an inverted cup-shaped member, a body member provided with two parts separated and insulated from each other and adapted to be rotatively positioned within the cup shaped member and provided with a circumferential groove, interlocking means on the supporting and body members preventing free axial movement of the said members, means on the supporting member to be bent into the groove to prevent separation of the parts, and means interposed between the supporting and body members to resist relative rotation of the last said members.

7. A conductor support comprising a support member to be secured to a support, a body member associated therewith in rotatable relation and provided with insulated means to receive a trolley wire attachment, bent-over means on the support member to engage the body member to prevent separation of the parts and resilient means interposed between the members to resist the free relative rotation of the members.

8. A conductor support comprising a supporting member provided with means to be secured to a support, a body member associated therewith, coacting threaded engagement between the members permitting relative rotation and simultaneous axial movement, resilient means interposed between the members to resist freedom of rotation and means secured to the body member but insulated therefrom to receive a conductor clamp.

In testimony whereof I affix my signature.

HARRY V. LINDERMAN